United States Patent [19]

Wignall et al.

[11] Patent Number: 4,872,526

[45] Date of Patent: Oct. 10, 1989

[54] SONIC WELL LOGGING TOOL LONGITUDINAL WAVE ATTENUATOR

[75] Inventors: Albert H. Wignall, Friendswood; David C. Hoyle, Houston, both of Tex.

[73] Assignee: Schlumberger Technology Corporation, Houston, Tex.

[21] Appl. No.: 220,777

[22] Filed: Jul. 18, 1988

[51] Int. Cl.$^4$ .............................................. G01V 1/40
[52] U.S. Cl. .................................. 181/102; 181/106; 367/25
[58] Field of Search .................. 367/25, 162; 181/102, 181/104, 106

[56] References Cited

U.S. PATENT DOCUMENTS

| | | | |
|---|---|---|---|
| 3,161,256 | 12/1964 | Pardue | 181/102 |
| 3,364,463 | 7/1966 | Pardue | 181/102 |
| 3,381,267 | 7/1966 | Cubberly, Jr. et al. | 367/25 |
| 3,504,757 | 11/1968 | Chapman, III | 181/104 |
| 3,978,939 | 1/1976 | Trouiller | 181/104 |
| 4,312,052 | 1/1982 | Vogel et al. | 367/75 |
| 4,365,321 | 12/1982 | Von Bose | 367/25 |
| 4,446,539 | 5/1984 | Von Bose | 367/25 |
| 4,518,888 | 5/1985 | Zabcik | 464/20 |
| 4,606,014 | 8/1986 | Winbow et al. | 367/75 |
| 4,649,525 | 3/1987 | Angoua et al. | 367/31 |

FOREIGN PATENT DOCUMENTS 0031989 7/1980 European Pat. Off. .

OTHER PUBLICATIONS

"Sonic Log Quality Control" by C. R. Bergman/Tenneco Oil Exploration & Production Headquarters Production Staff; Final Revision 11/88.
"A New Sonic Array Tool for Full Waveform Logging" by C. F. Morris, T. M. Little, and W. Letton, III; SPE 13285.
The Technical Review, vol. 35, No. 3, "New Ways to Make Shear Waves".
Borehole Geophysics 2, "Development of a Suspension PS Logging System's" by: Kenji Tanaka, Shingo Inoue, and Kimio Ogura, OYO Corp., Japan.
Geophysics, vo. 45, No. 10 (Oct. 1980): pp. 1489–150, 23 Figures, I Table, "A New Method for Shear Wave Logging", by: Choro Kitsunezaki.
Butsuri-Tanko (Geophysical Exploration), vol. 36, No. 6 (1983), (Receivers and Sources in the Suspension Type Shear Wave Logging,) by: Choro Kitsunezaki.

Primary Examiner—Thomas H. Tarcza
Assistant Examiner—Ian J. Lobo
Attorney, Agent, or Firm—Henry N. Garrana; John H. Bouchard

[57] ABSTRACT

A sonic isolation joint (SIJ) of a sonic well logging tool is disposed between a sonic transmitter section and a sonic receiver section of the tool and attenuates compressional and flexural waves which propagate longitudinally along an axis of the tool when the sonic transmitter transmits a pressure wave into a formation of a borehole. The SIJ comprises a first outer housing, a second outer housing, an inner housing disposed within the first and second outer housings, a first attenuation member disposed between the first outer housing and the inner housing and a second attenuation member disposed between the second outer housing and the inner housing, each of the attenuation members including a plurality of rubber isolating washers, and a plurality of steel washers interleaved with the plurality of rubber isolating washers. The attenuation members are each fit between a flange of the outer housing and a flange of the inner housing and are compressed when the sonic dipole tool string is lowered into the borehole.

9 Claims, 17 Drawing Sheets

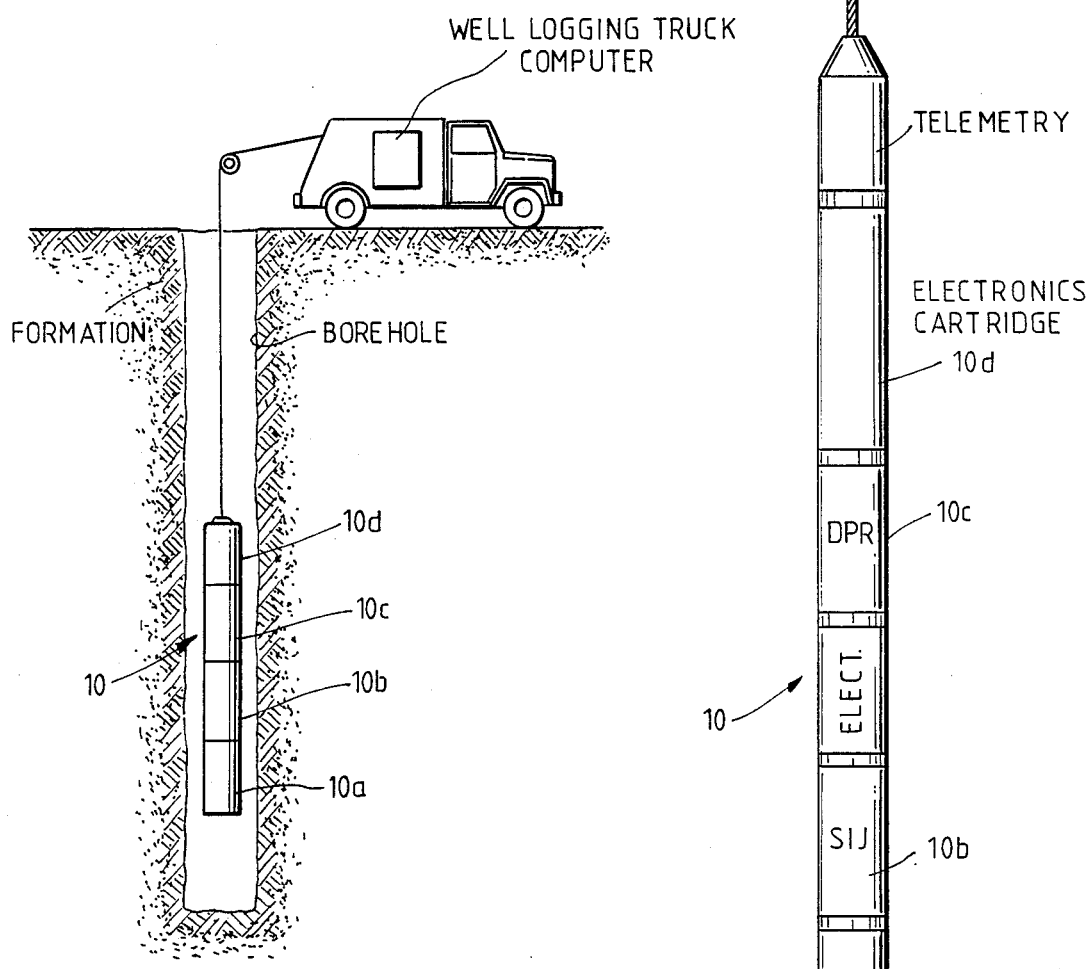

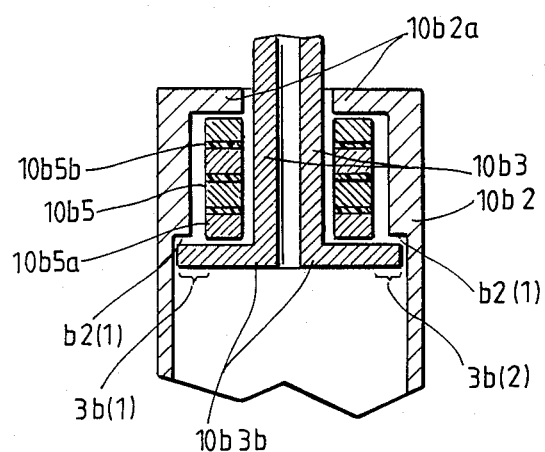
Fig. 5c (1)
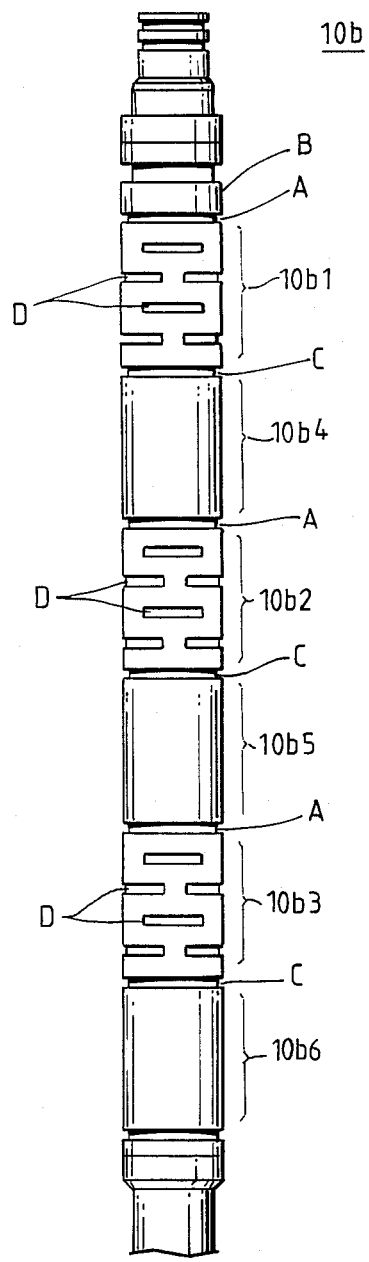
Fig. 9

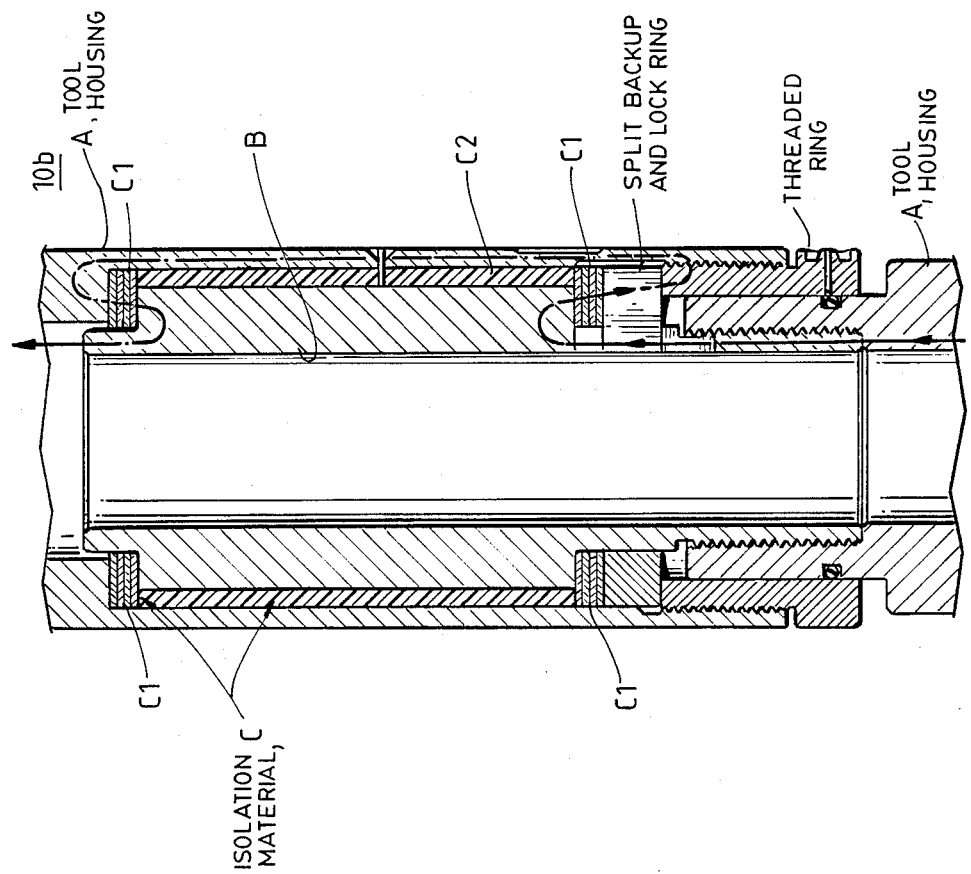

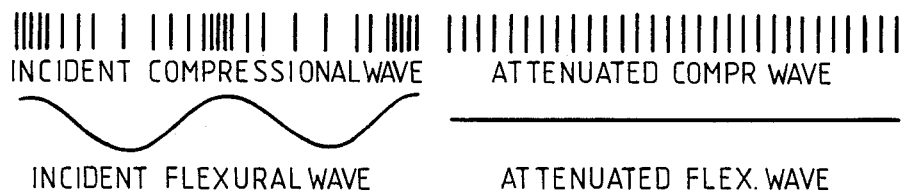
Fig. 6
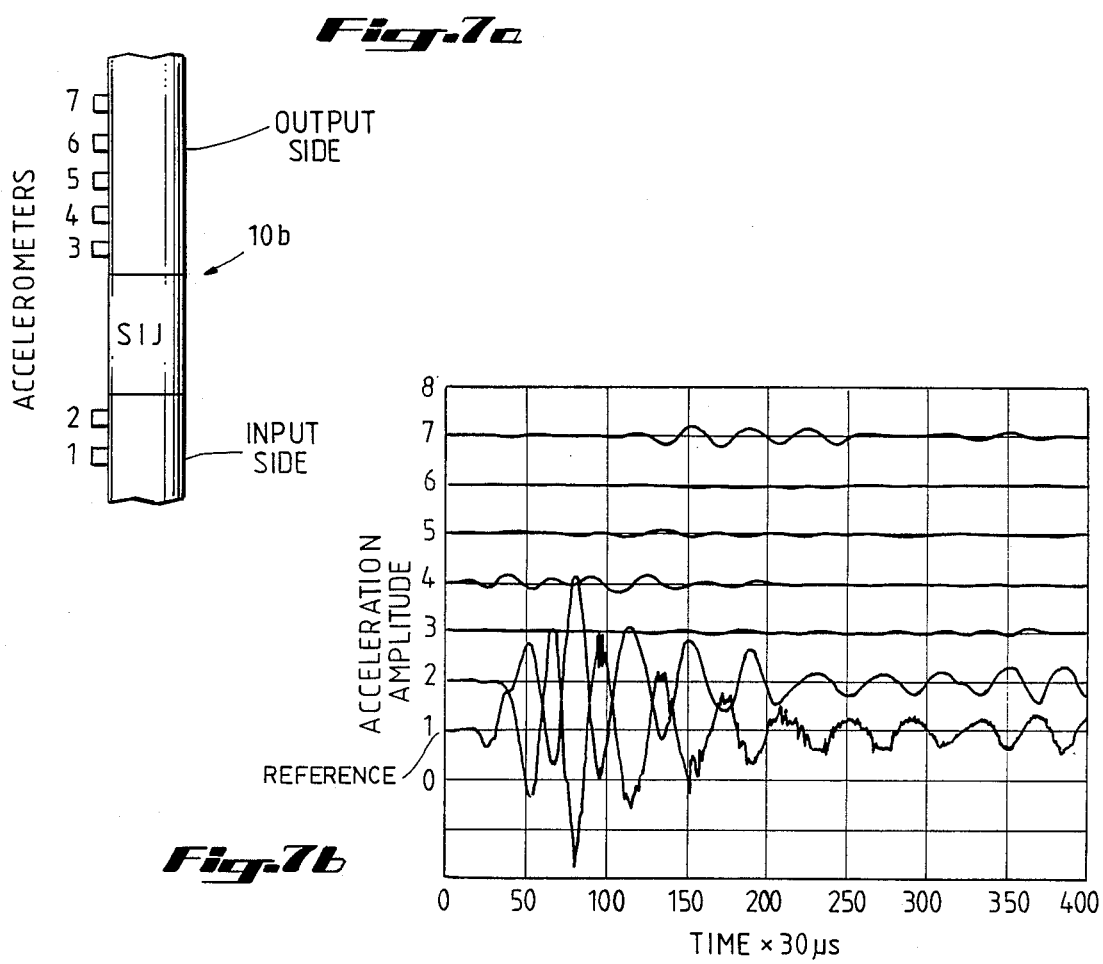
Fig. 7a
Fig. 7b

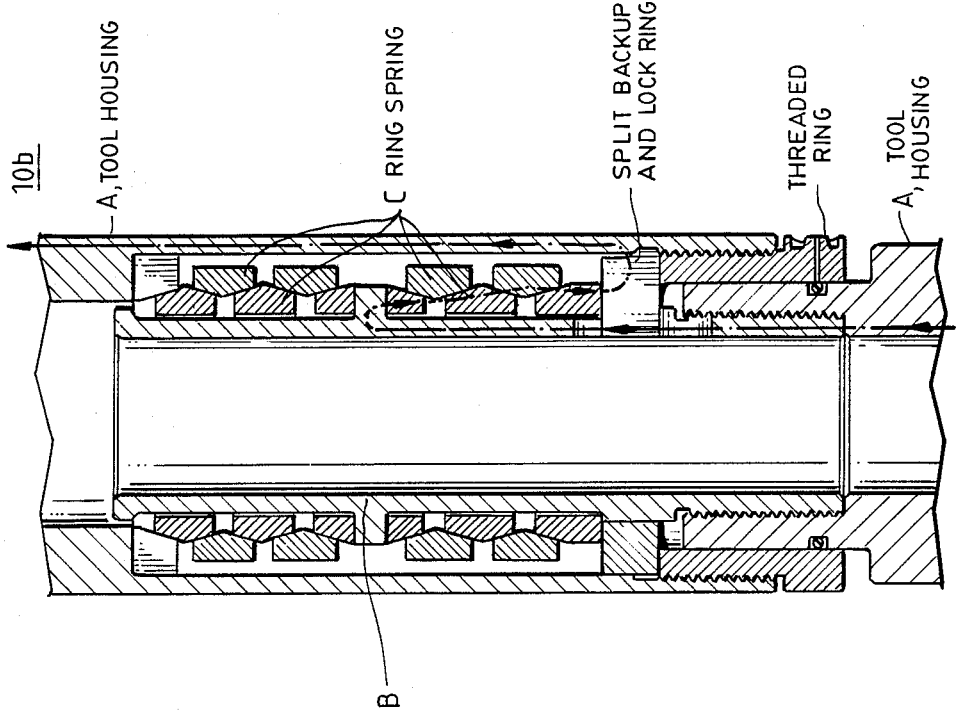
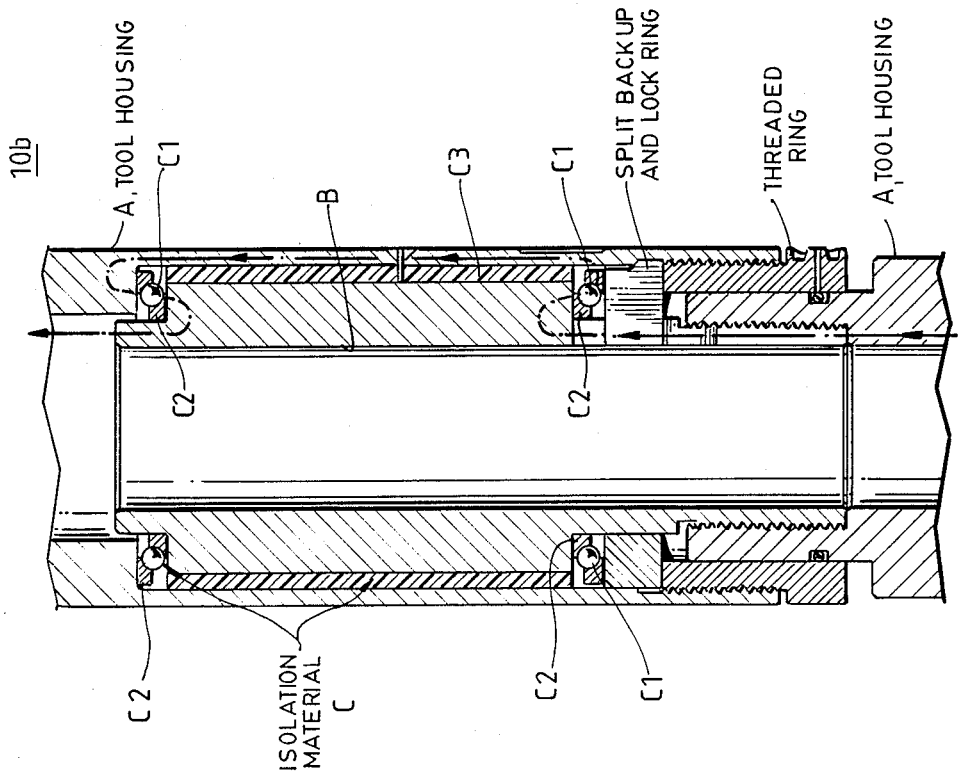

SONIC WELL LOGGING TOOL LONGITUDINAL WAVE ATTENUATOR

BACKGROUND OF THE INVENTION

The subject matter of the present invention relates to well logging tools, and in particular, to a sonic isolation joint for a sonic well logging tool.

Well logging tools are used in boreholes of oil wells for the purpose of determining if oil exists in a formation of the borehole. Some well logging tools are sonic in nature, in that they transmit a sonic pressure wave into the formation and receive the sonic pressure wave from the formation. The received sonic pressure wave is analyzed for the purpose of determining if oil exists in the formation. When the sonic pressure wave is transmitted, a corresponding compressional and flexural vibrational wave is transmitted longitudinally along the sonic tool, from the transmitter to the receiver. These compressional and flexural waves interfere with the performance of the sonic receiver. The receiver will record certain received sonic signals. Due to the existence of the compressional and flexural waves, it is difficult to determine which part of the received sonic signals corresponds to compressional/flexural waves, and which part corresponds to sonic pressure waves from the formation. Therefore, in order to improve the performance of the sonic well logging tool receiver, an attenuation member is placed intermediate the sonic transmitter and the sonic receiver. The attenuation member is designed to attenuate the compressional and flexural wave transmitted longitudinally along the sonic well logging tool. However, the weight of modern day well logging tools is increasing, due to the increased length of the well logging tool string. As a result, a new attenuation member design is needed to properly provide the necessary degree of compressional and flexural wave attenuation while, at the same time, withstanding the weight of the sonic well logging tool string.

SUMMARY OF THE INVENTION

Accordingly, it is a primary object of the present invention to provide an attenuator for a sonic dipole or sonic monopole tool used downhole in the borehole of an oil well which is capable of withstanding the significant weight of such tool and providing an acceptable amount of attenuation with respect to a compressional or flexural wave propagating longitudinally along the tool.

In accordance with these and other objects of the present invention, an attenuator, otherwise termed a sonic isolation joint (SIJ), is disposed between a transmitter and a receiver of a sonic well logging tool. The transmitter transmits pressure waves into the formation behind the borehole, and the receiver receives a pressure wave from the formation. The SIJ, interposed between the transmitter and receiver, receives a compressional and flexural wave propagating longitudinally along the body of the sonic tool. The SIJ includes an inner member, an outer member, and an attenuation member interposed between the inner member and the outer member of the SIJ, the attenuation member including a plurality of rubber-like discs and a plurality of metal-like discs interleaved with the plurality of rubber-like discs. When a compressional or flexural wave propagates along the body of the SIJ, it may, for example, pass through the outer member, through the interleaved rubber-like and metal-like discs of the attenuation member, and through the inner member. When the compressional/flexural waves emerge from the inner member, a significant amount of attenuation of the compressional/flexural wave is noted. Furthermore, since the attenuation member comprises a plurality of interleaved rubber-like and metal-like discs, a significant amount of weight of the sonic dipole or sonic monopole tool may be tolerated. Other embodiments of the attenuation member include a plurality of heavy metal masses and a plurality of slotted sleeve springs interleaved with the plurality of heavy metal masses, a ring spring, a plurality of metal washers in conjunction with an attenuation skirt, and an O-ring arrangement in conjunction with the attenuation skirt.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become apparent to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 1 illustrates a sonic dipole or sonic monopole tool including the SIJ of the present invention, in a borehole of an oil well;

FIG. 2 illustrates a more detailed view of the sonic dipole or sonic monopole tool including the SIJ of FIG. 1;

FIG. 5a(1) illustrates the lower housing 10b2 of FIG. 5a including a stop shoulder in the housing;

FIGS. 5c–5e illustrate different housings surrounding the SIJ of FIGS. 5a–5b;

FIG. 6 illustrates incident compressional/flexural waves and attenuated compressional/flexural waves;

FIGS. 7a–7b illustrate plots of acceleration vs time along different sections of the body of the sonic dipole tool thereby showing the attenuation capability of the SIJ of the present invention;

FIGS. 9–12 illustrate different other embodiments of the SIJ and/or of the attenuation member of the SIJ of the present invention.

DETAILED DESCRIPTION OF THE PREFERRED EMBODIMENT

Referring to FIG. 1, a well logging truck lowers a sonic dipole tool 10 into the borehole of an oil well. The sonic dipole tool 10 comprises a transmitter 10a, a Sonic Isolation Joint (SIJ) 10b, a receiver 10c and an electronics cartridge 10d.

Referring to FIG. 2, a better view of the sonic dipole tool 10 is again illustrated. In FIG. 2, a dipole transmitter (DPX) 10 is interposed between an electronics section and a sonic isolation joint (SIJ) (or isolation sub-ISO) 10b. A dipole receiver (DPR) 10c is interposed between another electronics section and the electronics cartridge 10d. The transmitter 10a transmits a pressure wave into the formation, the receiver 10c receives a pressure wave from the formation, and the electronics cartridge 10d, in conjunction with certain telemetry, transmits the received pressure wave signals to the well logging truck computer at the surface. In the meantime, the SIJ 10b receives any compressional and flexural waves, propagating longitudinally along the body of the tool 10, and attenuates these waves before the waves reach the receiver 10c.

Figure 3:
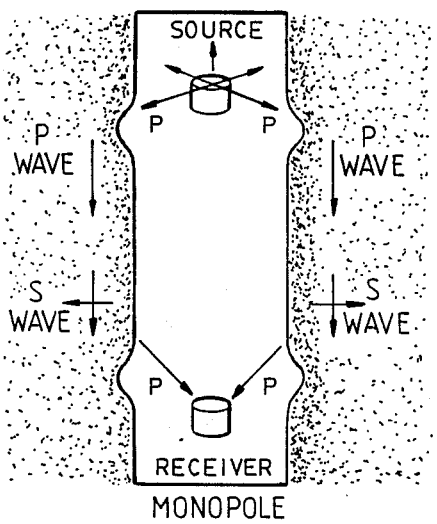
FIG. 3 illustrates the results produced in the formation of a borehole by a sonic monopole tool.

Referring to FIG. 3, a functional description of a sonic monopole well logging tool is illustrated. In FIG. 3, the sonic monopole tool transmitter produce positive pressure waves via volumetric expansion and contraction. Pressure and shear waves are generated in the formation, as illustrated, these pressure and shear waves propagating longitudinally along the axis of the borehole.

Figure 4:
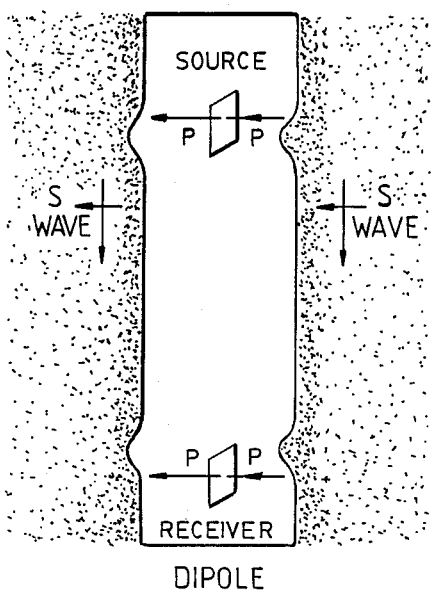
FIG. 4 illustrates the results produced in the formation of a borehole by a sonic dipole tool.

Referring to FIG. 4, a functional description of the sonic dipole well logging tool of FIG. 2 is illustrated. In FIG. 4, a moving plate (representing an asymmetric sound source) produces a positive pressure wave on one side of the tool and a negative pressure wave on the other side of the tool. No net volume change is produced. A positive shear wave propagates longitudinally on one side of the borehole and a negative shear wave propagates longitudinally on the other side of the borehole.

Figure 5A:
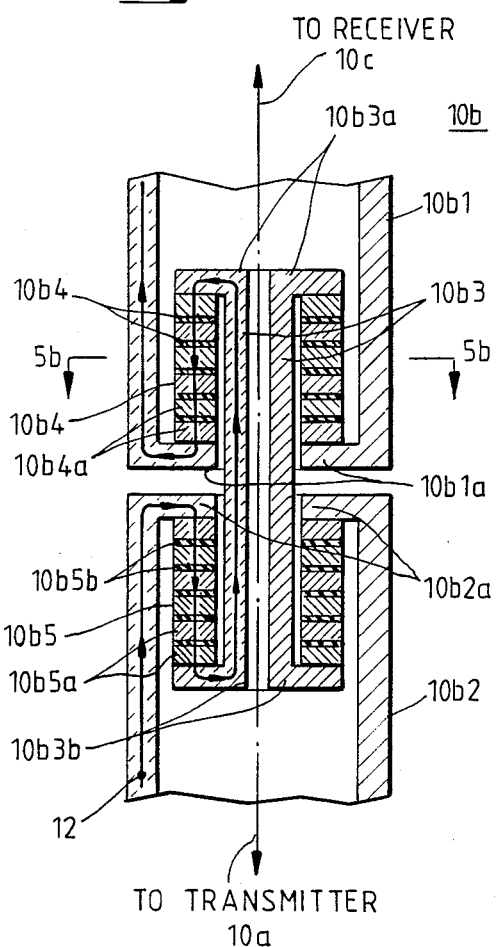
FIGS. 5a–5b illustrate one embodiment of the SIJ of the sonic dipole or sonic monopole tool of FIG. 2.
Figure 5B:
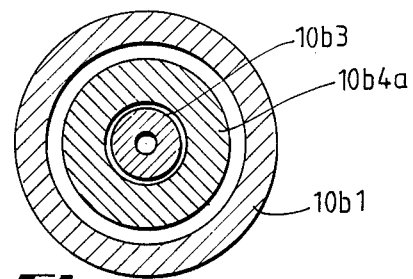

Referring to FIGS. 5a and 5b, a detailed construction of the Sonic Isolation Joint (SIJ) (or isolator sub ISO) 10b of the present invention is illustrated.

In FIG. 5a, the SIJ 10b comprises a first outer housing 10b1 including an internally directed flange 10b1a, a second outer housing 10b2 including an internally directed flange 10b2a, an inner member 10b3 coaxially located with respect to the first and second outer housings, the inner member 10b3 including outwardly directed flanges 10b3a and 10b3b integrally connected to each end of the inner member, a first attenuation member 10b4 coaxially disposed around the inner member 10b3 and disposed between the internally directed flange 10b1a of the first outer housing and the outwardly directed flange 10b3a of the inner member 10b3, and a second attenuation member 10b5 coaxially disposed around the inner member 10b3 and disposed between the internally directed flange 10b2a and the outwardly directed flange 10b3b of the inner member 10b3. The first attenuation member 10b4 and the second attenuation member 10b5 each comprise a plurality of rubber isolating washers 10b4a, 10b5a disposed around the inner member 10b3 and a plurality of steel washers 10b4b, 10b5b interleaved with the plurality of rubber isolating washers 10b4a, 10b5a and disposed around the inner member 10b3. Thus, the first attenuation member 10b4 comprises the plurality of rubber isolating washers 10b4a interleaved with the plurality of steel washers 10b4b, disposed around the inner member 10b3 and between the outwardly directed flange 10b3a and the internally directed flange 10b1a. Similarly, the second attenuation member 10b5 comprises the plurality of rubber isolating washers 10b5a interleaved with the plurality of steel washers 10b5b, disposed around the inner member 10b3 and between the outwardly directed flange 10b3b and the internally directed flange 10b2a. The first outer housing 10b1 and the second outer housing 10b2 may both be slotted sleeve housings, as shown in FIGS. 5c–5e. Attenuation members 10b4 and 10b5 are both immersed in clean oil within the housings 10b1 and 10b2.

Referring to FIG. 5b, a top view of the SIJ of FIG. 5a is illustrated, the top view being a section of the SIJ of FIG. 5a taken along section lines A—A of FIG. 5a. In FIG. 5b, the inner member 10b3 is shown, surrounded by the steel washer 10b4a, the steel washer being surrounded by outer housing 10b1.

Referring to FIG. 5a(1), the bottom outer housing 10b2 of FIG. 5a is illustrated, the bottom outer housing 10b2 including a stop shoulder b2(1) cut into housing 10b2. Outwardly directed flange 10b3b includes an extended part 3b(1)/3b(2) which is designed to abut against stop shoulder b2(1) when the isolator or SIJ 10b of tool 10 is pulled or drawn up the borehole. If the upward force of the pull does not exceed a certain amount, the attenuation member 10b5 may shoulder all the weight of the tool string, in which case, the extended part 3b(1)/3b(2) of flange 10b3b will not abut against the stop shoulder b2(1). However, if the upward force of the pull does exceed the certain amount, the extended part 3b(1)/3b(2) will abut against stop shoulder b2(1), thereby preventing damage to the attenuation member 10b5 and possibly attenuation member 10b4. Therefore, for long tool strings, the stop shoulder b2(1) will prevent the first and second attenuation members 10b4 and 10b5 from being damaged as a result of extremely heavy loads produced by a long tool string of the tool 10.

Referring to FIGS. 5c through 5e, alternate embodiments of the outer housings 10b1, 10b2 of FIG. 5a are illustrated. Each of these alternate embodiments of outer housings are slotted sleeve housings, and are discussed and illustrated in prior pending application Ser. No. 07/122,978, filed Nov. 19, 1987, entitled "Improved Logging Tool Housing with Acoustic Delay", the disclosure of which is incorporated by reference into the specification of this application.

Referring to FIG. 6, an incident flexural wave, an attenuated flexural wave, an incident compressional wave and an attenuated compressional wave is illustrated.

In FIG. 6, a compressional wave is one which compresses the sonic dipole or monopole tool 10 at a point on the tool near transmitter 10a, the specific compression propagating longitudinally along the axis of the tool 10. A flexural wave is one which flexes the tool 10 at the point on the tool near the transmitter 10a, producing a sine like wave which propagates longitudinally along the axis of the tool 10. In FIG. 6, note the incident compressional wave produced at the point near the transmitter 10a of the tool 10, and note how the compressional wave was attenuated at the receiver 10c of the tool. Also, in FIG. 6, note the incident flexural wave produced at the point near the transmitter 10a of the tool 10, and note how the flexural wave was attenuated at the receiver 10c of the tool.

A functional description of the operation of the Sonic Isolation Joint (SIJ) 10b of the present invention will be set forth in the following paragraph with reference to FIG. 5a of the drawings.

Transmitter 10a transmits sonic pressure waves into the borehole formation. A compressional wave and a flexural wave begins to propagate along the axis of the tool 10, from the bottom to the top of the illustration shown in FIG. 5a. In FIG. 5a, note a path indicated by the arrow 12. This path represents the path of propagation of the compressional and flexural waves as the waves propagate along the axis of the tool 10. The compressional and flexural waves propagate along the housing 10b2. The waves then propagate through the interleaved rubber isolating washers 10b5a and steel washers 10b5b of attenuation member 10b5, through inner member 10b3, through the interleaved rubber isolating washers 10b4a and the steel washers 10b4b of attenuation member 10b4, and through housing 10b1. As the waves propagate through the housing 10b2, the interleaved rubber and steel washers 10b5, the inner member 10b3, the interleaved rubber and steel washers 10b4, and the housing 10b1, each time a compressional or flexural wave passes from a housing region to an attenuation member region, from a rubber washer region to a steel washer region within the attenuation member, or from a steel washer region to a rubber washer region within the attenuation member, from an attenuation member region to an inner member region, from the inner member region to another attenuation member region, from rubber washer region to steel washer region within said another attenuation member, from steel washer region to rubber washer region within said another attenuation member, and from attenuation member region to outer housing region, a portion of the compressional or flexural wave is reflected back to the source (transmitter 10a). Therefore, the wave is attenuated each time it passes from one region to another region.

When the waves complete their passage through attenuation member 10b5, they pass into the outwardly directed flange 10b3b and into the inner member 10b3. The waves propagate upwardly along the inner member 10b3, into the outwardly directed flange 10b3a, and into the attenuation member 10b4. Each time the waves pass from flange 10b3b into inner member 10b3 and from inner member 10b3 to flange 10b3a and from flange 10b3a into attenuation member 10b4, a portion of the waves are reflected back to their source, and the waves are attenuated accordingly. The waves pass through the alternating, interleaved rubber isolating washers 10b4a and steel washers 10b4b of the attenuation member 10b4. Each time a compressional wave or flexural wave passes from a rubber washer region to a steel washer region, or from a steel washer region to a rubber washer region, a portion of the wave is reflected back to the source (transmitter 10a). When the waves complete their passage through attenuation member 10b4, they pass into outer housing 10b1 and upward to the receiver 10c. Again, a portion of the waves are reflected back to its source when passing into outer housing 10b1. At this point, the compressional and flexural waves are sufficiently attenuated so as not to adversely influence the performance of the receiver 10c, in detecting the shear waves in the formation.

Referring to FIGS. 7a through 7b, plots of acceleration vs time, along different sections of the body of the sonic dipole tool, are illustrated, showing the attenuation capability of the SIJ of the present invention.

In FIG. 7a, the SIJ 10b is shown intermediate an input side, which contains the transmitter 10a and an output side, which contains the receiver 10c. The input side contains accelerometers 1 and 2; the output side contains accelerometers 3 through 7. In FIG. 7b, plots of acceleration vs time, at different points along the tool body corresponding to accelerometers 1 through 7, are illustrated.

In FIG. 7b, at points 1 and 2 corresponding to accelerometers 1 and 2, a significant acceleration is experienced, corresponding to significant compressional/flexural vibrations at points 1 and 2. However, from points 3 through 7, corresponding to accelerometers 3 through 7, the acceleration has significantly decreased in intensity, corresponding to significantly decreased compressional/flexural vibrations at points 3 through 7. The decrease in acceleration is first noticeable at the point 3 curve of FIG. 7b. A significantly attenuated signal appears at the point 3 curve of FIG. 7b, as compared to the point 2 curve. Since, as shown in FIG. 7a, point 2 corresponds to a section of tool 10 immediately before the SIJ 10b, and point 3 corresponds to a section of tool 10 immediately after the SIJ 10b, it is evident that the attenuation of the acceleration vs time signal in FIG. 7b, when transcending from curve 2 to curve 3, is accomplished by the SIJ 10b of the present invention.

Figure 8:
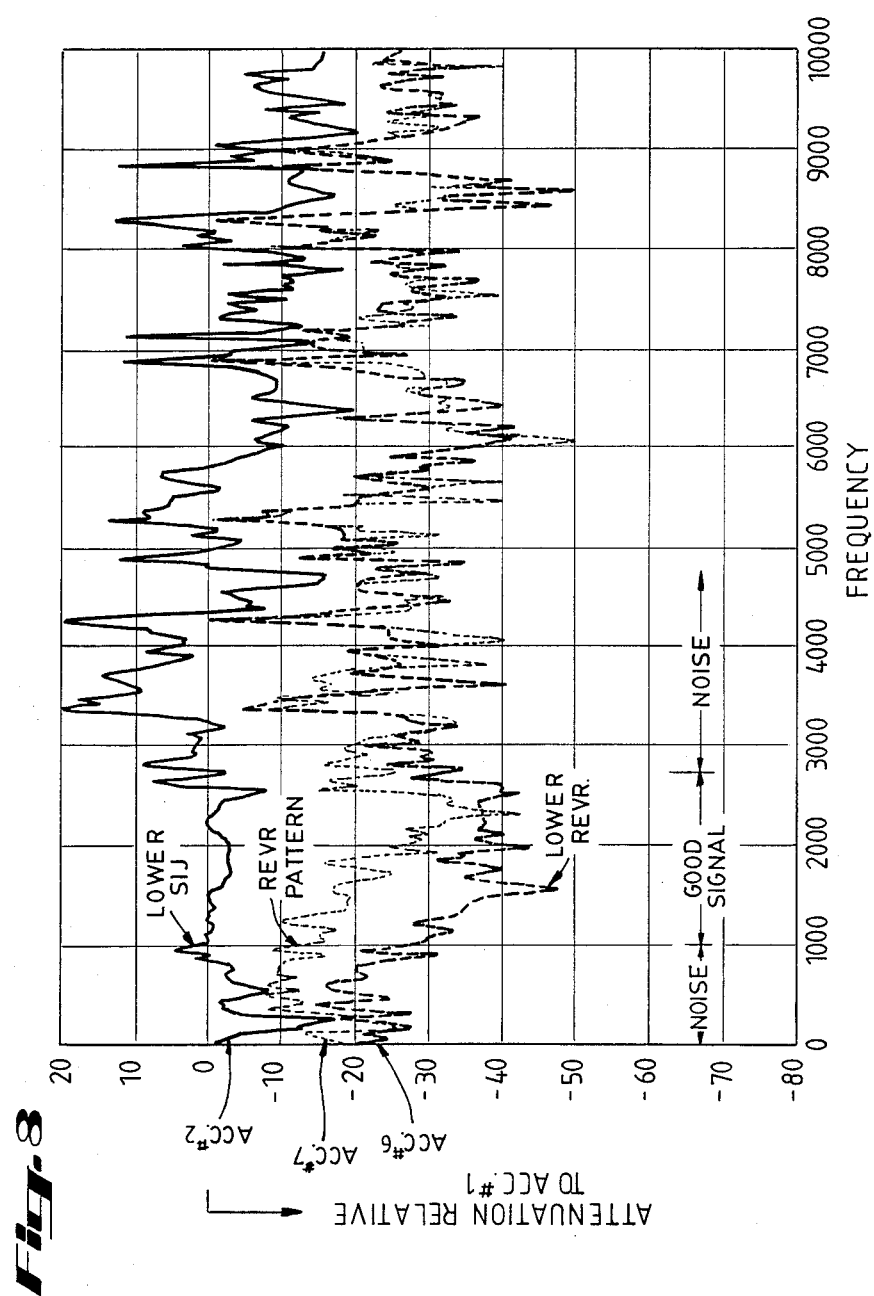
FIG. 8 illustrates attenuation vs frequency for different accelerometers located along the body of the sonic dipole tool.

Referring to FIG. 8, plots of attenuation versus frequency, for different accelerometers located along the body of the tool 10 as shown in FIG. 7a, are illustrated.

As shown in FIG. 8, the degree or amount of attenuation, experienced by a compressional and flexural wave, varies depending upon the frequency of the compressional/flexural wave when it passes through the SIJ of the present invention. For example, the compressional/flexural waves on the sonic dipole tool body corresponding to accelerometer #6 (after the waves have passed through the SIJ of the present invention) were significantly attenuated at frequencies between 1000 and 3000 Hz. However, the compressional/flexural waves on the tool body corresponding to accelerometer #2 (before the waves have passed through the SIJ of the present invention) were not significantly attenuated at frequencies between 1000 and 3000 Hz.

The SIJ 10b shown in FIGS. 5a-5b possesses one very great advantage over the isolators/attenuators of the prior art. Due to the alternate rubber washer, steel washer, rubber washer configuration of the attenuation members 10b4 and 10b5 shown in FIG. 5a, the SIJ of the present invention is capable of handling greater tool string weight relative to the isolators/attenuators of the prior art. Due to the alternate rubber, steel, rubber configuration of the attenuation members, the rubber washers 10b4a, 10b5a of the attenuation members 10b4, 10b5 are capable of being compressed to a greater degree than in other prior art attenuator configurations, thereby enabling the SIJ of the present invention to handle greater sonic tool string weights.

Referring to FIG. 9, another embodiment of the sonic isolation joint (SIJ) or isolator sub 10b of the present invention is illustrated. In FIG. 9, the isolator sub 10b comprises slotted sleeve "spring" sections 10b1, 10b2, 10b3 and heavy metal sections 10b4, 10b5, 10b6 made of a heavy metal, such as Tungsten, interleaved with the slotted sleeve "spring" sections. The isolator sub 10b makes use of the band stop filtration characteristics inherent in periodic spring-mass structures. The slotted sleeve "spring" sections 10b1-10b3 act as springs (or distributed members with low acoustic impedance), and the heavy metal sections 10b4-10b6 act as masses (or distributed members with high acoustic impedance). The slotted sleeve "spring" sections 10b1-10b3 each comprise an assembly joint A provided for thread relief only partially cut into the housing B and completely surrounding a circumference of housing B, another assembly joint C provided for thread relief, partially cut into housing B and completely surrounding a circumference of housing B, and a plurality of partial slots D partially cut into housing B and only partially surrounding a circumference of housing B. The plurality of partial slots D each provide a significant amount of attenuation. The heavy metal sections 10b4–10b6 each comprise a heavy metal, such as tungsten. Therefore, when a compressional and flexural wave propagates along the isolator sub 10b of FIG. 9, it must pass through a relatively light, spring-like section (10b1–10b3), through a relatively heavy, massive section (10b4–10b6), back into another relatively light, spring-like section, etc. Since the spring-like sections and the massive sections are so different in terms of structural characteristics, when the waves pass from a spring-like section to a massive section, and vice-versa, or from one partial slot D to housing to another partial slot D within the spring-like sections, portions of the compressional/flexural waves reflect back to the source (the transmitter).

Referring to FIGS. 10 through 12, other embodiments of the sonic isolation joint (SIJ) or isolator sub 10b of the present invention are illustrated.

In FIG. 10, the isolator sub 10b comprises an outer tool housing A, an inner tool housing B, and attenuation member (or isolation material) C interposed between the outer tool housing A and the inner tool housing B. The isolation material C comprises a plurality of metal rings or washers C1 on one end of inner housing B, a plurality of metal rings or washers C1 on the other end of inner housing B, and an isolation skirt C2 disposed circumferentially around the inner housing B. The isolation skirt C2 is also made of metallic material. The path of propagation taken by a compressional wave or flexural wave, when passing through the isolator sub 10b of FIG. 10, is shown by the arrow.

In FIG. 11, the isolator sub 10b comprises an outer tool housing A, an inner tool housing B, and an attenuation member (or isolation material) C interposed between the outer tool housing A and the inner tool housing B. The isolation material C comprises a rubber O-ring C1 on one end of the inner housing B, the O-ring C1 being disposed between, and in pressed engagement with, two metallic ribs C2; another rubber O-ring C1 is disposed on the other end of the inner housing B, this other O-ring C1 also being disposed between, and in pressed engagement with, two metallic ribs C2; and an isolation skirt C3 circumferentially disposed between the inner housing B and the outer housing A. The path of propagation taken by a compressional or flexural wave, when passing through the isolator sub 10b of FIG. 11, is shown by the arrow.

In FIG. 12, the isolator sub 10b comprises an outer tool housing A, an inner tool housing B, and an attenuator member (or isolation material) C comprising a "ring-spring", which ring spring is wrapped tightly around the inner housing B. The ring spring includes a plurality of rings, each ring being shaped to engage with another ring about its periphery or circumference. By appropriately shaping the cross section of each ring, a plurality of such rings may be fit together tightly and in tight pressed engagement around the inner housing B. The path of propagation taken by a compressional or flexural wave, when passing through the isolator sub 10b of FIG. 12, is shown by the arrow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim as our invention:

1. An attenuator for use with a well logging tool in attenuating a wave propagating longitudinally along said tool when said tool is disposed in a borehole of an oil well, comprising:

a plurality of layers of a first material, said first material including metal washers;

a plurality of layers of a second material interleaved with the plurality of layers of the first material, the second material including rubber-like washers; and an inner member, the interleaved rubber-like washers and metal washers being wrapped around said inner member, said inner member including an outwardly directed flange on which one end of the interleaved rubber-like washers and metal washers rest.

2. The attenuator of claim 1, further comprising:

an outer housing, the outer housing including an inwardly directed flange, the interleaved rubber-like and metal washers being disposed between said inwardly directed flange of said outer housing and said outwardly directed flange of said inner member.

3. The attenuator of claim 2, wherein said wave is attenuated as it propagates between said inwardly directed flange of said outer housing, said interleaved rubber-like and metal washers, and said outwardly directed flange of said inner member.

4. The attenuator of claim 2, wherein said outer housing includes a stop shoulder, said outwardly directed flange of said inner member including an extended part, the extended part of said inner member abutting against said stop shoulder of said outer housing when said well logging tool is abruptly drawn up said borehole of said oil well.

5. An attenuator adapted to be disposed in a well tool, comprising:

a plurality of layers of a first material;

a plurality of layers of a second material interleaved with the plurality of layers of the first material;

an inner member, the interleaved first material and second material being wrapped around said inner member, said inner member including an outwardly directed flange, one end of the interleaved first material and second material being in contact with said outwardly directed flange; and an outer housing, the outer housing including an inwardly directed flange, the interleaved first material and second material being disposed between said inwardly directed flange of said outer housing and said outwardly directed flange of said inner member.

6. The attenuator of claim 5, wherein said first material and said second material each have a composition, the composition of the first material being different than the composition of the second material.

7. The attenuator of claim 5, wherein said outer housing includes a stop shoulder, said outwardly directed flange of said inner member including an extended part, the extended part of said outwardly directed flange adapted to abut against said stop shoulder of said outer housing.

8. An attenuator for use with a well tool, comprising:
an inner housing member;
an outer housing member;
an isolation skirt disposed between said inner housing member and said outer housing member and disposed completely around a circumference of said inner housing member;
a plurality of washers tightly pressed together and disposed between said inner housing member and said outer housing member at one end of said isolation skirt; and
a further plurality of washers tightly pressed together and disposed between said inner housing member and said outer housing member at the other end of said isolation skirt.

9. An attenuator for use with a well tool, comprising:
an inner housing member;
an outer housing member;
an isolation skirt disposed between said inner housing member and said outer housing member and disposed completely around a circumference of said inner housing member;
a first attenuation member disposed between said inner housing member and said outer housing member at one end of said isolation skirt, said first attenuation member including a first rib, a second rib, and an O-ring disposed between and in pressed engagement with said first rib and said second rib; and
a second attenuation member disposed between said inner housing member and said outer housing member at the other end of said isolation skirt, said second attenuation member including a third rib, a fourth rib, and an O-ring disposed between and in pressed engagement with said third rib and said fourth rib.

* * * * *